(12) United States Patent
Ono et al.

(10) Patent No.: US 9,151,691 B2
(45) Date of Patent: Oct. 6, 2015

(54) METHOD AND APPARATUS FOR DETECTING AIRTIGHT STATE OF MACHINE-TOOL WINDOW

(71) Applicant: MORI SEIKI CO., LTD., Nara (JP)

(72) Inventors: Katsuhiko Ono, Nara (JP); Norio Sato, Nara (JP); Kimiyuki Nishimura, Nara (JP)

(73) Assignee: Mori Seiki Co., LTD., Nara (JP)

( * ) Notice: Subject to any disclaimer, the term of this patent is extended or adjusted under 35 U.S.C. 154(b) by 15 days.

(21) Appl. No.: 14/084,178

(22) Filed: Nov. 19, 2013

(65) Prior Publication Data

US 2014/0150533 A1    Jun. 5, 2014

(30) Foreign Application Priority Data

Dec. 3, 2012  (JP) ................. 2012-264304

(51) Int. Cl.
   *G01M 3/08*   (2006.01)
   *G01M 3/04*   (2006.01)
   *G01M 3/32*   (2006.01)

(52) U.S. Cl.
   CPC .............. *G01M 3/04* (2013.01); *G01M 3/3272* (2013.01)

(58) Field of Classification Search
   CPC ........ G01M 3/04; G01M 3/12; G01M 3/3272
   USPC ................................. 73/38, 40, 46
   See application file for complete search history.

(56) References Cited

U.S. PATENT DOCUMENTS

| | | | | |
|---|---|---|---|---|
| 3,326,035 A | * | 6/1967 | Hirota et al. .................... 73/40 |
| 3,524,342 A | * | 8/1970 | Hobbs ............................. 73/40 |
| 3,664,965 A | * | 5/1972 | Hirota et al. ............... 252/408.1 |
| 3,811,317 A | * | 5/1974 | Leonard et al. .................. 73/40 |
| 3,872,712 A | * | 3/1975 | Westervelt et al. .............. 73/40 |
| 3,937,064 A | * | 2/1976 | Wolf et al. ....................... 73/40 |
| 4,002,055 A | * | 1/1977 | Kops ............................... 73/40 |
| 4,104,905 A | * | 8/1978 | Zachary .......................... 73/40 |
| 4,363,236 A | * | 12/1982 | Meyers ........................... 73/40 |
| 4,449,393 A | * | 5/1984 | Tucker et al. ..................... 73/40 |
| 4,467,635 A | * | 8/1984 | Dahmen et al. ............. 73/40.5 R |
| 4,510,791 A | * | 4/1985 | Yuill ............................... 73/40 |
| 4,513,605 A | * | 4/1985 | Hawerkamp ..................... 73/40 |
| 4,517,826 A | * | 5/1985 | Cole et al. ....................... 73/40 |
| 4,534,208 A | * | 8/1985 | Macin et al. .................. 73/49.3 |
| 4,635,469 A | * | 1/1987 | Modera et al. ................... 73/40 |
| 4,765,810 A | * | 8/1988 | Wetzel .......................... 96/417 |
| 4,979,390 A | * | 12/1990 | Schupack et al. ................ 73/38 |
| 5,182,941 A | * | 2/1993 | Frenkel et al. ................... 73/40 |

(Continued)

FOREIGN PATENT DOCUMENTS

JP    03166037    7/1991

*Primary Examiner* — Laura Martin
*Assistant Examiner* — Samir M Shah
(74) *Attorney, Agent, or Firm* — Miller, Matthias & Hull LLP (57) ABSTRACT

Methods and apparatus for detecting machine tool window airtightness includes an airtight state detector, having a sensor detecting the pressure in a space of the window, and a judging section for determining appropriateness of the airtight state of the space based on a pressure value from the pressure sensor and outputting a judgment result. Pressure in the window space, which initially may be pressurized or pressure-reduced, is detected intermittently by the pressure sensor, and the judging section determines appropriateness of the airtight state of the window on the basis of a variation state of the detected pressure.

8 Claims, 6 Drawing Sheets

(56) References Cited

U.S. PATENT DOCUMENTS

| | | | | |
|---|---|---|---|---|
| 5,214,957 A | * | 6/1993 | Collins | 73/40 |
| 5,404,747 A | * | 4/1995 | Johnston et al. | 73/40 |
| 5,559,282 A | * | 9/1996 | Knight et al. | 73/40 |
| 5,780,722 A | * | 7/1998 | Kovacs | 73/40 |
| 5,886,636 A | * | 3/1999 | Toomey | 340/602 |
| 6,209,269 B1 | * | 4/2001 | Valderrama | 52/171.3 |
| 6,358,854 B1 | * | 3/2002 | Fleming et al. | 438/692 |
| 6,823,719 B2 | * | 11/2004 | Poblete | 73/46 |
| 7,872,465 B2 | * | 1/2011 | Cao et al. | 324/71.1 |
| 8,122,776 B2 | * | 2/2012 | Fox | 73/862.581 |
| 8,166,804 B2 | * | 5/2012 | Walker et al. | 73/86 |

\* cited by examiner

METHOD AND APPARATUS FOR DETECTING AIRTIGHT STATE OF MACHINE-TOOL WINDOW

TECHNICAL FIELD

The present disclosure relates to a method and an apparatus for detecting, on a machine tool provided with a cover body having a window, an airtight state of the window, the window comprising two transparent or translucent window plates which are airtightly joined together with a pre-determined distance between them.

BACKGROUND

Usually, taking into consideration safety and environmental aspects, a machine tool is provided with a cover body for dividing a machining region from an external region and the cover body is provided with a window so that the machining region can be observed from the outside thereof.

As an example of such a cover body having a window, conventionally, the cover body disclosed in the Japanese Unexamined Patent Application Publication No. 3-166037 has been known. The cover body (specifically, a slide door) disclosed in this published application is made of a plate-shaped polycarbonate and has a structure in which a glass plate is attached to the inside (the machining-region side) of a portion to be a window thereof.

According to this cover body, because the polycarbonate plate constituting the cover body has very high toughness and high impact resistance, for example, even if an unexpected accident in which a tool collides with a workpiece happens due to an operation error or an error in program generation, it is possible to completely prevent the tool and the workpiece from shooting out of the machining region due to the collision.

While a polycarbonate plate has high toughness and high impact resistance as described above, its hardness is not so high, that is, its wear resistance is not so high, and therefore a polycarbonate plate has a disadvantage that, when chips generated by cutting or the like hit its surface, its surface is shaved by the chips and becomes rough, thereby resulting in deterioration in transparency (visibility) therethrough, for example.

Therefore, in the above conventional cover body, in order to prevent the surface of the polycarbonate plate from becoming rough due to chips and maintain good visibility therethrough, a structure is employed in which a glass plate having high wear resistance is attached to the inside (the machining-region side) of a portion to be a window of the polycarbonate plate.

Thus, according to the conventional cover body having the above-described structure, the glass plate arranged on the machining-region side makes it possible to prevent deterioration in visibility (good observability from the outside), which is caused by chips, and the polycarbonate plate having high toughness and high impact resistance makes it possible to completely prevent the tool and the workpiece from shooting out of the machining region, and therefore it is possible to secure high safety.

By the way, in recent years, it has been found out that the polycarbonate plate has, besides the disadvantage that it has low wear resistance, a disadvantage that it has low resistance to coolant and, if it is in contact with coolant for a long time, its high toughness and high impact resistance, which are its advantages, are reduced.

Therefore, at present, the cover body except for the window is made of sheet metal and the window employs a structure in which a glass plate and a polycarbonate plate are arranged on the machining-region side and the external side, respectively, and they are airtightly joined together with a pre-determined distance between them.

According to the window having such a structure, the polycarbonate plate is prevented from coming into contact with coolant and it is therefore possible to prevent the toughness and the impact resistance of the polycarbonate plate from being reduced due to coolant.

SUMMARY OF THE DISCLOSURE

However, even the window having the structure in which the glass plate and the polycarbonate plate are airtightly joined together with a pre-determined distance between them has a problem as described below.

That is, although, if the airtightness of the joined portion between the glass plate and the polycarbonate plate of the window is secured, coolant is not allowed to enter between the glass plate and the polycarbonate plate and therefore the reduction of toughness and impact resistance of the polycarbonate plate due to coolant does not occur, the airtightness has not been fully ensured conventionally.

For example, conventionally, a method of detecting the airtightness between the glass plate and the polycarbonate plate in manufacturing the window has not been suggested, and therefore, in the present circumstances, it cannot be said that the airtightness is fully ensured at the time of manufacturing.

Further, even if the airtightness is ensured at the time of manufacturing, it is possible that a seal member does not have sufficient resistance to coolant, and in this case there is the fear that the airtightness is lowered by deterioration over time of the seal member.

Furthermore, various loads act on the window during operating the machine tool. For example, a load acts on the window due to an operation of sliding the cover body and a load also acts on the window due to collision of chips or coolant therewith. Further, a load also acts on the window due to deflection caused by cutting heat or heat transmitted from various sources of heat generation. Such loads deform the window, and, if such deformation is repeated for a long time, the airtightness of the joined portion can be lowered.

Further, in some cases, an excessive load acts on the glass plate and thereby causes a crack therein and the airtightness is therefore lowered.

Thus, in the window having the above-described structure, the airtightness thereof has not been fully ensured conventionally.

Although naturally the polycarbonate plate has a determined useful life and the window is to be replaced on a regular basis, there is the fear that, if coolant enters between the glass plate and the polycarbonate plate due to poor airtightness and the polycarbonate plate thereby falls into a situation where it comes into contact with the coolant, the polycarbonate plate deteriorates earlier than scheduled and its toughness and impact resistance are remarkably reduced before the replacement.

If the above-described unexpected accident happens in this situation, a serious accident in which the tool or the workpiece penetrates the window comprising the glass plate and the polycarbonate plate and shoots out of the machining region might be caused.

The present disclosure has been achieved in view of the above-described background and an object thereof is to provide a detecting method and a detecting apparatus for detecting whether high airtightness of the window is maintained.

The present disclosure, for achieving the above-described object, relates to an airtight state detecting method of detecting, on a machine tool having a cover body with a window, an airtight state of the window, the window comprising two transparent or translucent window plates which are airtightly joined together with a pre-determined distance between them, wherein a space between the window plates is brought into a pressurized state or a pressure-reduced state and the pressure in the space is detected, and appropriateness of the airtight state of the space of the window is judged on the basis of the detected pressure.

According to the present disclosure, first of all, the space between the window plates is brought into a pressurized state or a pressure-reduced state. Then, in this state, the pressure in the space is detected. Although the pressure in the space does not vary when the airtight state of the space is good, the pressure in the space varies when the airtight state of the space is not maintained. That is, the pressure in the space is gradually reduced in the case where the space has been brought into the pressurized state, and the pressure in the space is gradually increased in the case where the space has been brought into the pressure-reduced state. Therefore, it is possible to judge appropriateness of the airtight state of the space on the basis of the detected pressure.

Further, this detecting method can be performed by an airtight state detecting apparatus having: a pressure sensor which detects the pressure in the space; and a judging section which judges appropriateness of the airtight state of the space on the basis of a value of the pressure detected by the pressure sensor and outputs a result of the judgment to the outside. Furthermore, the space can be brought into a pressurized state or a pressure-reduced state as appropriate using a pressure adjusting device having a pressurizing pump or a pressure reducing pump.

It is noted that, in the case where the space is brought into a pressure-reduced state, if a leak portion is present and therefore the airtightness is not secured, the outside gas is sucked into the space through the leak portion, and if coolant is present near the leak portion, the coolant is sucked into the space through the leak portion. On the other hand, in the case where the space is brought into a pressurized state, even if a leak portion is present, because the gas within the space is discharged through the leak portion, coolant never enters the space through the leak portion even if present near the leak portion. Therefore, it is preferred that the space is brought into a pressurized state.

In the present disclosure, a configuration is possible in which the detection of the pressure in the space using the pressure sensor is performed occasionally or on a regular basis, and when the pressure detected by the pressure sensor is out of a predetermined allowable range, the judging section judges that the airtight state is inappropriate.

Further, the allowable range, which is the criterion for the judgment, may be changed in accordance with an elapsed time from the initial state where the space has been brought into a pressurized state or a pressure-reduced state.

As for the airtight state, in reality, it is difficult to achieve a completely airtight state and leakage can occur within a range where there is no problem in practical use, and such leakage is allowable. In this case, the pressure in the space gradually varies over time within a range where there is no practical problem. Therefore, in the case where the allowable range which is the criterion for the judgment is held fixed, when a long time has elapsed, the pressure in the space becomes out of the predetermined allowable range and the judging section therefore judges that the airtight state is inappropriate, in spite of the fact that the pressure has varied over time within the range where there is no practical problem.

Therefore, by changing the allowable range which is the criterion for the judgment in accordance with an elapsed time from the initial state as mentioned above, that is, by assuming that the pressure in the space varies over time within the range where there is no practical problem and gradually varying the allowable range which is the criterion for the judgment in accordance with the variation of the pressure, it is possible to cancel the variation over time of the pressure within the range where there is no practical problem and judge appropriateness of the airtight state of the window accurately in the judging process in the judging section.

Further, in the present disclosure, the airtight state detecting apparatus may have a configuration in which, when it is detected for a predetermined time period or a predetermined number of times that the pressure in the space detected by the pressure sensor is within a pressure correction range which is set as a predetermined range within the upper limit or the lower limit of the allowable range, the pressure in the space is increased or reduced by the pressure adjusting device to set the pressure in the space to a predetermined pressure which is within the allowable range and out of the pressure correction range.

As described above, as for the airtight state, it is in reality difficult to achieve a completely airtight state and the pressure in the space gradually varies over time within the range where there is no practical problem. Therefore, when it is detected for a predetermined time period or a predetermined number of times that the pressure in the space is within the pressure correction range which is set as a predetermined range within the upper limit or the lower limit of the allowable range, a judgment is made that the pressure has varied over time within the range where there is no practical problem, and the pressure in the space is returned to a predetermined pressure which is within the allowable range and out of the pressure correction range by the pressure adjusting device. When thus configured, even when the pressure varies over time within the range where there is no practical problem, it is possible to judge appropriateness of the airtight state accurately in the state where the allowable range which is the criterion for the judgment is held fixed.

Further, in the present disclosure, the airtight state detecting apparatus may have a configuration in which the pressure in the space is detected by the pressure sensor while the pressure in the space is increased or reduced by the pressure adjusting device, and when the detected pressure does not reach a predetermined reference pressure within a predetermined time period, the judging section judges that the airtight state is inappropriate.

Furthermore, in the present disclosure, the airtight state detecting apparatus may have a configuration in which the pressure in the space is detected occasionally or on a regular basis by the pressure sensor, and when variation of the detected pressure exceeds a predetermined variation range, the judging section judges that the airtight state is inappropriate.

It is noted that, although, for the two window plates which constitute the window in the present disclosure, a glass plate can be used as the window plate disposed on the machining-region side and a polycarbonate plate can be used as the window plate disposed on the external side, this structure is an example and the present disclosure is not limited thereto. The present disclosure can be preferably applied to a window in which a material having high wear resistance is used as the window plate disposed on the machining-region side and a material having high toughness and high impact resistance but having low resistance to coolant is used as the window plate disposed on the external side.

As described in detail above, according to the airtight state detecting method and the airtight state detecting apparatus of the present disclosure, it is possible to accurately detect the airtight state of the window comprising two transparent or translucent window plates which are airtightly joined together with a pre-determined distance between them. Therefore, in the case where a material having low resistance to coolant is used as the window plate disposed on the external side, it is possible to take a proper preventive measure, for example, replacing the window with a new one earlier, when the airtight state is judged to be inappropriate, and taking such a preventive measure makes it possible to prevent a serious accident in which a tool or a workpiece penetrates the window and shoots out from being caused.

DETAILED DESCRIPTION

Figure 1:
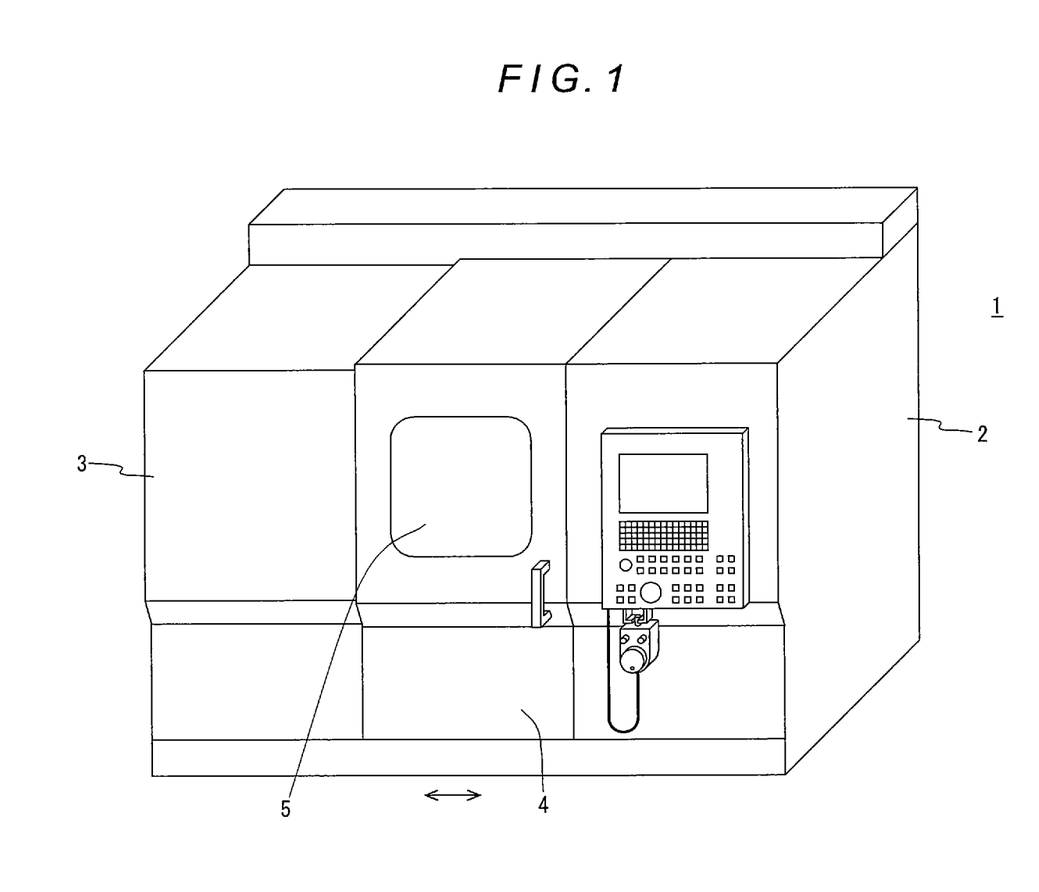
FIG. 1 is a perspective view of the whole of a machine tool according to a specific embodiment of the present disclosure.
Figure 2:
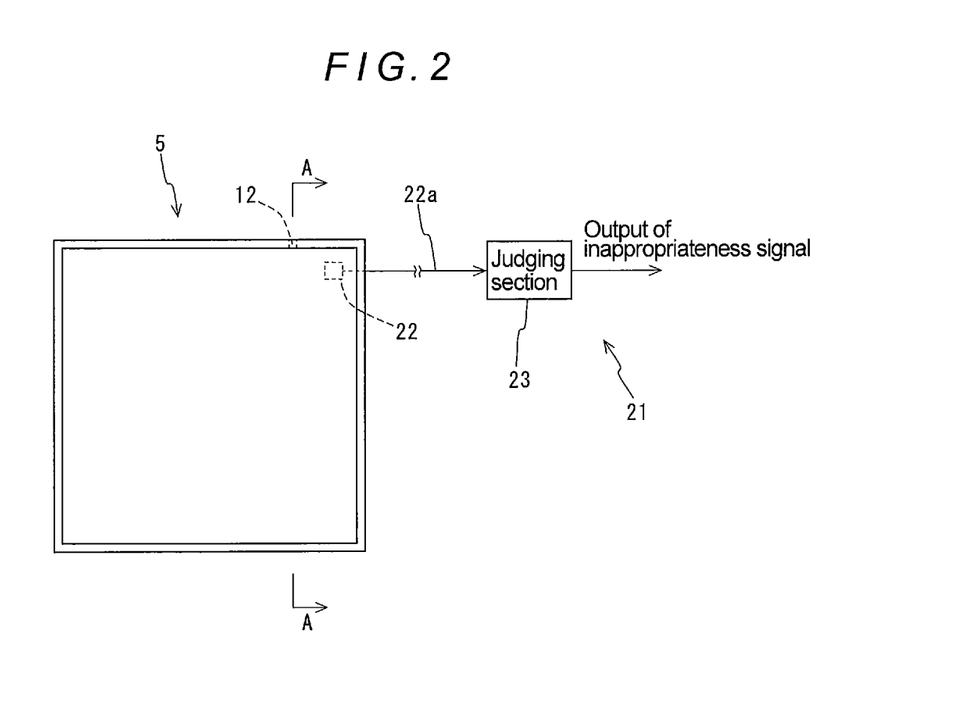
FIG. 2 is an illustration showing a schematic configuration of an airtight state detecting apparatus according to the specific embodiment of the present disclosure.
Figure 3:
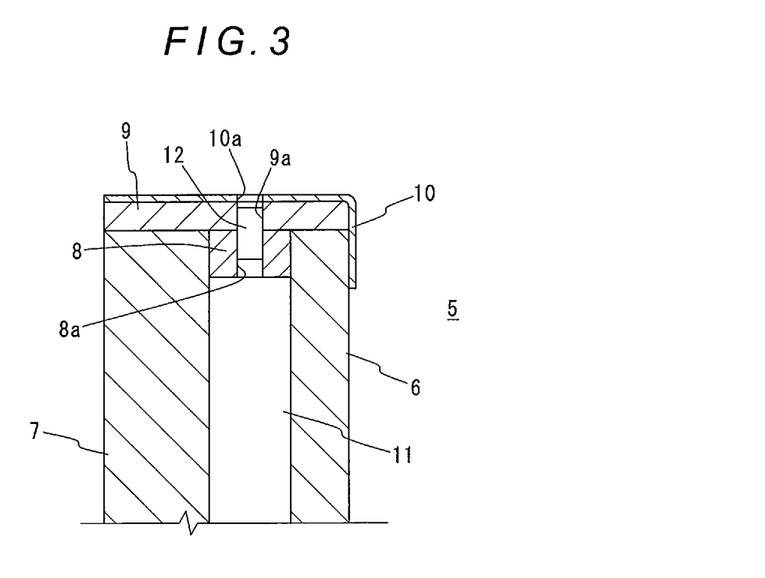
FIG. 3 is a partial cross-sectional view taken along the arrow A-A of FIG. 2.

Hereinafter, a specific embodiment of the present disclosure will be described with reference to the drawings. FIG. 1 is a perspective view of the whole of a machine tool according to the embodiment, FIG. 2 is an illustration showing a schematic configuration of an airtight state detecting apparatus according to the embodiment, and FIG. 3 is a partial cross-sectional view taken along the arrow A-A of FIG. 2.

Machine Tool and Window

First of all, a machine tool 1 and a window 5 of the embodiment are described. As shown in FIG. 1, the machine tool 1 of the embodiment is specifically an NC lathe, and its structures such as a bed, a headstock, a tool rest, etc. are covered by two fixed covers (cover bodies) 2, 3 and a door cover (cover body) 4 which is slidable in the directions indicated by the arrow, and the machine tool 1 has a structure in which a machining region is separated from the outside by the fixed covers 2, 3 and the door cover 4.

The fixed covers 2, 3 are each made of a metal plate, and the door cover 4 has the window 5 and is made of a metal plate except for the window 5.

As shown in FIGS. 2 and 3, the window 5 comprises a glass plate 6 and a polycarbonate plate 7 which are transparent or translucent and have the same rectangular shape, and further comprises a spacer 8, a seal member 9 and a frame body 10. The spacer 8 is a rectangular frame-shaped member, and is disposed to be positioned at an outer peripheral edge portion between the glass plate 6 and the polycarbonate plate 7 to define a distance between them.

Further, the seal member 9 similarly comprises a rectangular frame-shaped member and is joined to the glass plate 6, the spacer 8 and the polycarbonate plate 7 to seal the outer peripheral surface of an assembly comprising the glass plate 6, the spacer 8 and the polycarbonate plate 7, which are integrally assembled to each other as shown in FIG. 3. Furthermore, the frame body 10 is a rectangular frame body having an L-shaped cross section, and is joined to the seal member 9 and the glass plate 6 so that it covers the outer peripheral surface and a side surface of the seal member 9 and a peripheral side surface of the glass plate 6.

Further, the window 5 has through holes 8a, 9a, 10a formed in the spacer 8, the seal member 9 and the frame body 10, respectively, so that an opening is formed in an outer peripheral surface of the frame body 10. Furthermore, a check valve 12 is airtightly buried inside the through hole 9a of the seal member 9. Using a pressure adjusting device having a pressurizing pump or a pressure reducing pump, the pressure in a space 11 between the glass plate 6 and the polycarbonate plate 7 is increased or reduced through the check valve 12.

Thus, the window 5 has a structure in which the glass plate 6 and the polycarbonate plate 7 are airtightly joined together with a pre-determined distance between them, and the space 11 between the glass plate 6 and the polycarbonate plate 7 is brought into a pressurized state or a pressure-reduced state. The thus-configured window 5 is fixedly provided in an opening of the door cover 4 so that the glass plate 6 is positioned on the machining-region side, and the machining region can be observed through the window 5.

Airtight State Detecting Apparatus

Next, an airtight state detecting apparatus 21 of the embodiment is described. As shown in FIG. 2, the airtight state detecting apparatus 21 of the embodiment comprises a pressure sensor 22 disposed in the space 11 between the glass plate 6 and the polycarbonate plate 7 of the window 5, and a judging section 23 which judges appropriateness of the airtight state of the window 5 on the basis of a value of the pressure in the space 11 detected by the pressure sensor 22.

Various pressure sensors can used as the pressure sensor 22, such as an electrical capacitance pressure sensor, a metal strain gauge pressure sensor and a piezoelectric element type pressure sensor, and a signal line 22a for taking out a signal output from the pressure sensor 22 passes through the spacer 8, the seal member 9 and the frame body 10 of the window 5 and is led to the outside. It is noted that the signal line 22a airtightly passes through at least part of the spacer 8, the seal member 9 and the frame body 10. That is, the structure is designed so that leading the signal line 22a to the outside does not cause deterioration of the airtight state of the window 5.

The judging section 23 is a functional section which receives pressure data detected by the pressure sensor 22 through the signal line 22a, judges appropriateness of the airtight state of the space 11 on the basis of the received pressure data, and outputs a result of the judgment to the outside, and the judging section 23 comprises a computer having software for arithmetic operation, an arithmetic circuit as hardware or the like.

Judging Method for Appropriateness of Airtight State

Next, a judging method for judging appropriateness of the airtight state in the judging section 23 is described. In the case where the space 11 of the window 5 having the structure as described above has been brought into a pressurized state or a pressure-reduced state as the initial state, although the pressure in the space 11 does not varies when the airtight state is good, the pressure in the space 11 varies when the airtight state is not good. That is, the pressure is gradually reduced in the case where the space 11 has been brought into a pressurized state, and the pressure is gradually increased in the case where the space 11 has been brought into a pressure-reduced state. Therefore, it is possible to judge appropriateness of the airtight state of the space 11 on the basis of a value of the pressure detected by the pressure sensor 22.

1. First Mode

First, a first mode of the judging method is described. As the first mode, a mode may be adopted in which the judging section 23 samples pressure data output from the pressure sensor 22 occasionally or on a regular basis, and when the sampled pressure value becomes our of a predetermined allowable range, the judging section 23 judges that the airtight state is inappropriate, and outputs an signal (inappropriateness signal) to the outside.

Figure 4:
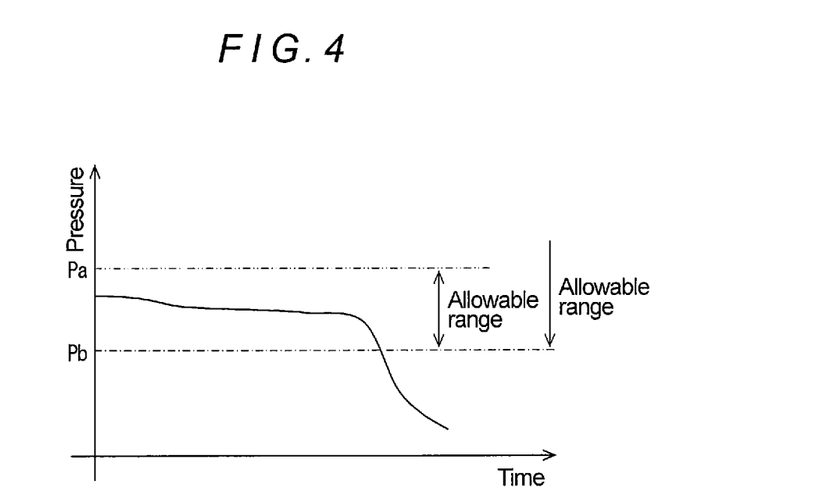
FIG. 4 is an illustration for explaining a first mode for judgment of airtight state.

FIG. 4 shows an example of variation of the pressure in the space 11 in the case where the space 11 has been brought into a pressurized state as the initial state. Although the allowable range may be set to have both an upper limit (Pa) and a lower limit (Pb), it may be set to have only the lower limit (Pb) because the pressure in the space 11 does not increase over time in the case where the initial state is a pressurized state. When the sampled pressure value becomes lower than the lower limit (Pb), the judging section 23 judges that the airtight state is inappropriate, and outputs an inappropriateness signal to the outside.

Figure 5:
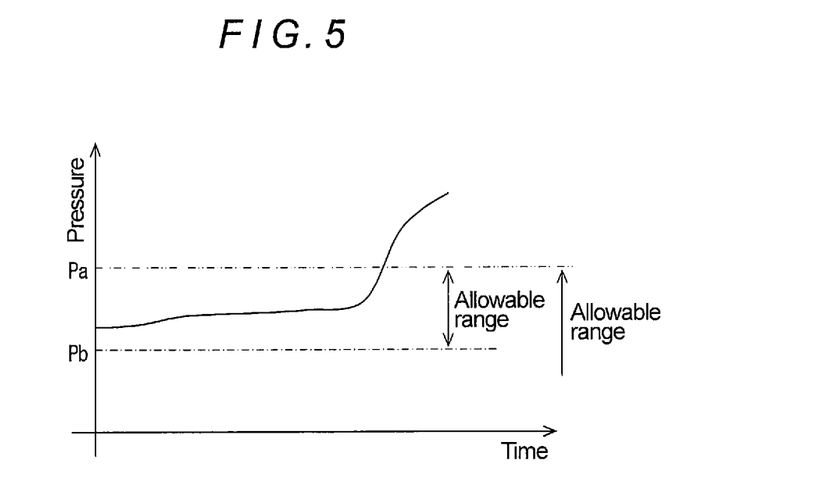
FIG. 5 is an illustration for explaining the first mode for judgment of airtight state.

On the other hand, FIG. 5 shows an example of variation of the pressure in the space 11 in the case where the space 11 has been brought into a pressure-reduced state as the initial state. Also in this case, although the allowable range may be set to have both an upper limit (Pa) and a lower limit (Pb), it may be set to have only the upper limit (Pa) because the pressure does not further reduce over time in the case where the initial state is a pressure-reduced state. When the sampled pressure value becomes higher than the upper limit (Pa), the judging section 23 judges that the airtight state is inappropriate, and outputs an inappropriateness signal to the outside.

It is noted that, in the case where the space 11 has been brought into a pressure-reduced state, if a leak portion is present and therefore the airtightness of the space 11 is not maintained, the outside gas is sucked into the space 11 through the leak portion, and if coolant is present near the leak portion, the coolant is sucked into the space 11 through the leak portion. On the other hand, in the case where the space 11 has been brought into a pressurized state, even if a leak portion is present, because the gas within the space 11 is discharged through the leak portion, coolant never enters the space 11 through the leak portion even if present near the leak portion. In view of the above, it is preferred that the space 11 is brought into a pressurized state as the initial state.

2. Second Mode

As a second mode, a mode may be adopted in which the allowable range, which is the criterion for the judgment, is set to a value which is changed in accordance with an elapsed time from the initial state where the space 11 has been brought into a pressurized state or a pressure-reduced state, and the judging section 23 samples pressure data output from the pressure sensor 22 occasionally or on a regular basis, and when the sampled pressure value becomes out of the allowable range corresponding to the time when the value is sampled, the judging section 23 judges that the airtight state is inappropriate, and outputs an inappropriateness signal to the outside.

Although, as described above, the window 5 of the embodiment employs the structure in which the outer peripheral surfaces of the glass plate 6, the spacer 8 and the polycarbonate plate 7 are sealed by the seal member 9, it is in reality difficult to achieve a completely airtight state for the airtight state of the space 11 and leakage can occur within a range where there is no problem in practical use, that is, within a range which is allowed. In this case, the pressure in the space 11 gradually varies over time within a range where there is no practical problem, that is, the pressure gradually reduces in the case where the initial state is a pressurized state, and the pressure gradually increases in the case where the initial state is a pressure-reduced state. Therefore, in the case where the allowable range which is the criterion for the judgment is held fixed, a disadvantage is caused where, when a long time has elapsed, the pressure in the space 11 becomes out of the set allowable range and the judging section 23 therefore judges that the airtight state is inappropriate, in spite of the fact that the pressure has varied over time within the range where there is no practical problem.

Therefore, by changing the allowable range which is the criterion for the judgment in accordance with an elapsed time from the initial state as described above, that is, by assuming that the pressure in the space 11 varies over time within the range where there is no practical problem, for example, previously measuring the variation over time of the pressure in the space 11 with no leakage as practical problem to thereby obtain the tendency of the variation of the pressure, and gradually changing the allowable range which is the criterion for the judgment in accordance with the tendency, it is possible to cancel the variation over time of the pressure within the range where there is no practical problem and judge appropriateness of the airtight state accurately in the judgment process in the judging section 23.

Figure 6:
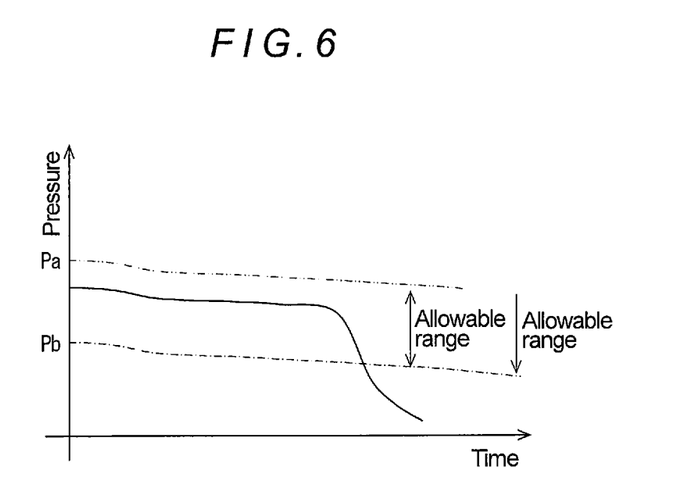
FIG. 6 is an illustration for explaining a second mode for judgment of airtight state.

FIG. 6 shows the allowable range in the case where the variation over time of the pressure in the space 11 with no leakage as practical problem is previously measured to thereby obtain the tendency of the variation and the allowable range is gradually varied in accordance with the tendency, wherein a lower limit Pb is indicated by a one-dot chain line and an upper limit Pa is indicated by a two-dot chain line. As described above, when the sampled pressure value becomes out of the allowable range corresponding to the time when the value is sampled, the judging section 23 judges that the airtight state is inappropriate. It is noted that the allowable range may be set to have only the lower limit Pb.

Further, also in this mode, the space 11 may be brought into a pressure-reduced state as the initial state. Even when the space 11 is brought into a pressure-reduced state, it is possible to set the allowable range which is varied over time in the same way as when the space 11 is brought into a pressurized state, and similarly, cancelling the variation over time of the pressure within the range where there is no practical problem makes it possible to judge appropriateness of the airtight state accurately. Furthermore, in this case, the allowable range may be set to have only the upper limit Pa.

It is noted that, also in the second mode, similarly to the first mode, in view of prevention of entry of coolant, it is preferred that the space 11 is brought into a pressurized state as the initial state.

3. Third Mode

As a third mode, a mode may be adopted in which the judging section 23 samples pressure data output from the pressure sensor 22 occasionally or on a regular basis, and when the sampled pressure value varies beyond a predetermined variation range, the judging section 23 judges that the airtight state is inappropriate, and outputs an inappropriateness signal to the outside.

Figure 7:
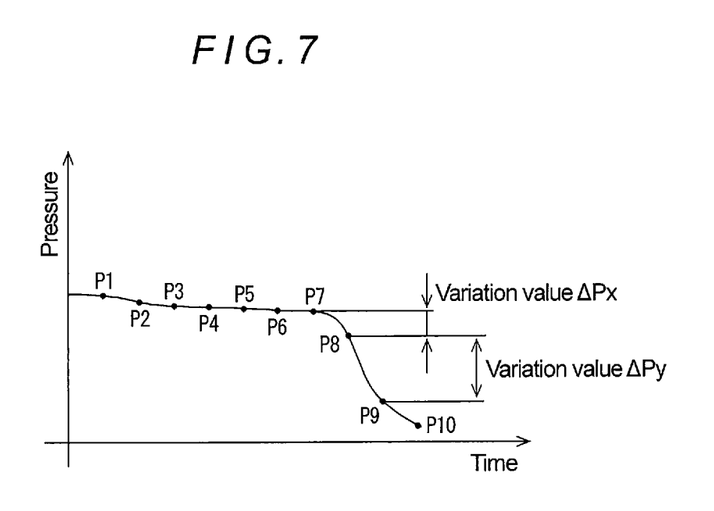
FIG. 7 is an illustration for explaining a third mode for judgment of airtight state.

FIG. 7 shows pressure variation in the case where the initial state of the space 11 is a pressurized state, and the judging section 23, for example, calculates, on the basis of pressure values (P1, P2, P3 . . . ) which are obtained successively, differential vales between them ((P1−P2), (P2−P3), (P3−P4) . . . ) as variation values and compares the calculated variation values with a predetermined reference value, and when the variation value exceeds the reference value, judges that the airtight state is inappropriate. In FIG. 7, if calculated variation values ΔPx, ΔPy against a reference value Ps is ΔPx<Ps<ΔPy, at the time when ΔPy is calculated, the judging section 23 judges that the airtight state is inappropriate, and outputs an inappropriateness signal to the outside.

Further, also in this mode, although the initial state of the space 11 may be a pressure-reduced state, in view of prevention of entry of coolant, it is preferred that the initial state is a pressurized state. In the case where the space 11 is brought into a pressure-reduced state, similarly, the judging section 23 calculates, on the basis of pressure values obtained successively, differential values between them as variation values, and compares the calculated variation values with a predetermined reference value (which is a variation value as a reference and is a reference variation range), and when the variation value exceeds the reference value, judges that the airtight state is inappropriate.

Subsequently, variations of the airtight state detecting apparatus 21 are described.

Variation 1 of Airtight State Detecting Apparatus

Figure 8:
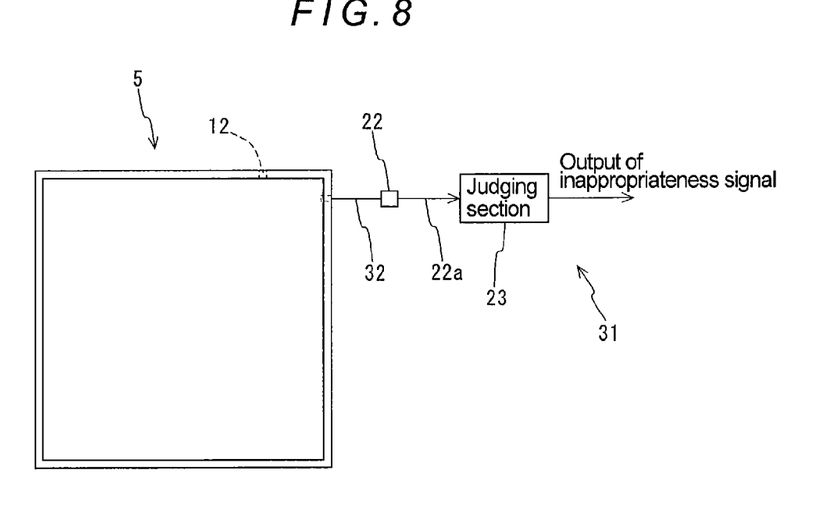
FIG. 8 is an illustration showing a schematic configuration of an airtight state detecting apparatus according to another embodiment of the present disclosure.

FIG. 8 shows an airtight state detecting apparatus 31 as Variation 1. As shown in FIG. 8, the airtight state detecting apparatus 31 has a lead-out pipe 32 which is led to the outside passing through the spacer 8, the seal member 9 and the frame body 10 so that it communicates with the space 11 of the window 5. It is noted that the lead-out pipe 32 airtightly passes through at least part of the spacer 8, the seal member 9 and the frame body 10. That is, the structure is designed so that providing the lead-out pipe 32 does not cause deterioration of the airtight state of the window 5.

The pressure sensor 22 is connected to an outside end portion of the lead-out pipe 32 so that it seals the pipe line, and the pressure in the space 11 is detected by the pressure sensor 22 through the lead-out pipe 32 and the detected pressure data is transmitted to the judging section 23 through the signal line 22a.

Thus, also according to the airtight state detecting apparatus 31, the pressure in the space 11 is detected by the pressure sensor 22, and appropriateness of the airtight state of the window 5 is judged on the basis of the detected pressure data in the judging section 23, and when the airtight state is judged to be inappropriate, an inappropriateness signal is output from the judging section 23 to the outside.

It is noted that, for the judging method in the judging section 23, any one of the above-described first to third modes may be employed.

Variation 2 of Airtight State Detecting Apparatus

Figure 9:
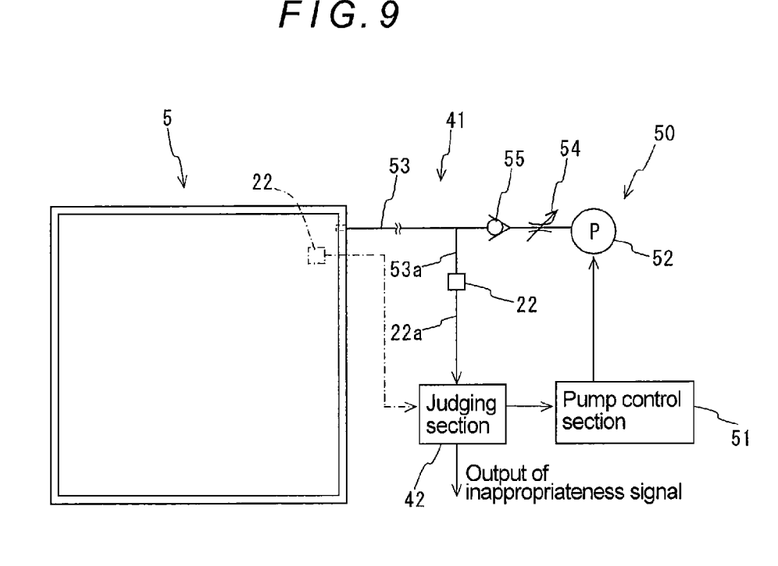
FIG. 9 is an illustration showing a schematic configuration of an airtight state detecting apparatus according to further another embodiment of the present disclosure.

FIG. 9 shows an airtight state detecting apparatus 41 as Variation 2. As shown in FIG. 9, the airtight state detecting apparatus 41 comprises a pressure sensor 22, a judging section 42 and a pressure adjusting device 50.

The pressure adjusting device 50 comprises: a connecting pipe 53 which is connected to the window 5 passing through the spacer 8, the seal member 9 and the frame body 10 so that one end thereof communicates with the space 11 of the window 5; a throttle valve 54 and a check valve 55 which are disposed intermediately in the connecting pipe 53; a pump 52 connected to the other end of the connecting pipe 53; and a pump control section 51 which controls operations of the pump 52.

The connecting pipe 53 airtightly passes through at least part of the spacer 8, the seal member 9 and the frame body 10, and the structure is designed so that providing the connecting pipe 53 does not cause deterioration of the airtight state of the window 5.

Further, the pressure sensor 22 is connected to an end portion of a branch pipe 53a branching from the connecting pipe 53 between the one end thereof and the check valve 55 so that it seals the pipe line, and the pressure in the space 11 is detected through the branch pipe 53a and the connecting pipe 53 and the detected pressure data is transmitted to the judging section 42 through a signal line 22a.

Furthermore, the pump 52 comprises a pressurizing pump or a pressure reducing pump, and the pump control section 51 controls operations of the pump 52 in accordance with a predetermined control program or control circuit, and receives a control signal from the judging section 42 and controls operations of the pump 52 in accordance with the received control signal.

According to the airtight state detecting apparatus 41, first, the pump 52 is actuated under the control by the pump control section 51, and thereby the pressure in the space 11 is increased in the case where the pump 52 is a pressurizing pump, or the pressure in the space 11 is reduced in the case where the pump 52 is a pressure reducing pump, thereby bringing the space 11 into a pressurized state or a pressure-reduced state as the initial state.

It is noted that, since the throttle valve 54 is provided in the connecting pipe 53, the gas passing through the connecting pipe 53 is limited to a flow rate corresponding to the degree of openness of the throttle valve 54, and the pressure in the space 11 is gradually increased or reduced depending on the degree of openness of the throttle valve 54.

Further, since the check valve 55 is provided in the connecting pipe 53, after the pump 52 is stopped, the flow of the gas within the connecting pipe 53 is stopped by the check valve 55 and the pressurized or pressure-reduced state of the space 11 is maintained. It is noted that, although FIG. 9 shows the check valve 55 in the case of increasing the pressure, the check valve 55 is reversed in the case of reducing the pressure.

After the space 11 has been brought into the initial state in the way as described above, the pressure in the space 11 is detected by the pressure sensor 22 and appropriateness of the airtight state of the window 5 is judged on the basis of the detected pressure data in the judging section 42, and when the airtight state is judged to be inappropriate, an inappropriateness signal is output from the judging section 42 to the outside.

It is noted that, although the pressure sensor 22 is connected to the branch pipe 53a branching from the connecting pipe 53 in the airtight state detecting apparatus 41, it is possible to replace this mode with a mode in which the pressure sensor 22 is disposed within the space 11 similarly to the airtight state detecting apparatus 21. Such a mode is indicated by the one-dot chain line in FIG. 9.

Although any one of the above-described first to third modes may be employed for the judging method in the judging section 42, either of the following fourth and fifth modes may be employed instead of the first to third modes.

Fourth Mode of Judging Method

As a fourth mode, a mode may be adopted in which, when it is detected for a predetermined time period or a predetermined number of times that the pressure detected by the pressure sensor 22 is within a pressure correction range which is set as a predetermined range within the upper limit or the lower limit of the allowable range, the judging section 42 actuates the pump 52 by outputting an actuating signal to the pump control section 51 and thereby increases or reduces the pressure in the space 11, thereby returning the pressure in the space 11 to a predetermined pressure which is within the allowable range and out of the pressure correction range.

Figure 10:
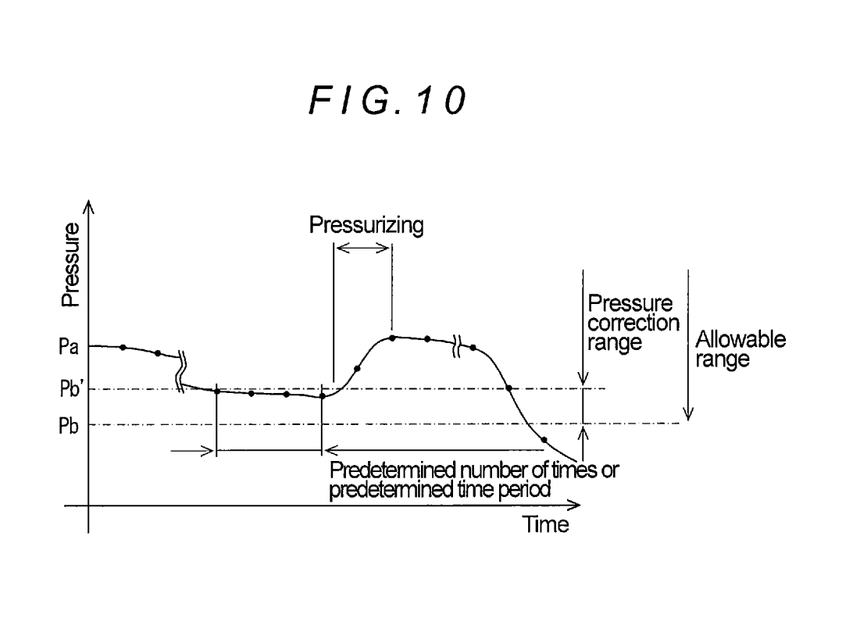
FIG. 10 is an illustration for explaining a fourth mode for judgment of airtight state.

For example, as shown in FIG. 10, the pressure correction range having a predetermined range (from Pb to Pb') is set within (above) the lower limit (Pb) of the allowable range, and when it is detected a predetermined number of times (or for a predetermined time period) (4 times in FIG. 10) that the pressure detected by the pressure sensor 22 is within the pressure correction range, the judging section 42 actuates the pump 52 and thereby increases the pressure in the space 11, thereby returning the pressure in the space 11 to a predetermined pressure which is within the allowable range and out of the pressure correction range (for example, the pressure at the time of the initial state). It is noted that, although FIG. 10 shows the case where the space 11 has been brought into a pressurized state and, similarly to the above, a pressurized state is preferred, the space 11 may be brought into a pressure-reduced state and in this case a state shown by turning FIG. 10 upside down is assumed.

As has been described, as for the airtight state of the space 11, it is in reality difficult to achieve a completely airtight state and leakage can occur within a range where there is no problem in practical use, that is, within a range which is allowed. In this case, the pressure in the space 11 gradually varies over time within a range where there is no practical problem, that is, the pressure gradually reduces in the case where the initial state is a pressurized state, and the pressure gradually increases in the case where the initial state is a pressure-reduced state. Therefore, in the case where such a variation over time is left as it is, a disadvantage is caused where, the pressure in the space 11 becomes out of the allowable range and the judging section 42 therefore judges that the airtight state is inappropriate, in spite of the fact that the pressure has varied over time within the range where there is no practical problem.

Therefore, in the fourth mode, when it is detected for a predetermined time period or a predetermined number of times that the pressure in the space 11 is within the pressure correction range which is set as a predetermined range within the upper limit or the lower limit of the allowable range, a judgment is made that this pressure variation is a gradual variation and is a variation over time within the range where there is no practical problem, and the pressure in the space 11 is returned by the pressure adjusting device 50 to a predetermined pressure which is within the allowable range and out of the pressure correction range. When thus configured, even when the pressure varies over time within the range where there is no practical problem, it is possible to judge appropriateness of the airtight state accurately in the state where the allowable range which is the criterion for the judgment is held fixed.

It is noted that, in this mode, although, when it is detected for a predetermined time period or a predetermined number of times that the pressure in the space 11 is within the pressure correction range, the pressure in the space 11 is returned to a predetermined pressure by the pressure adjusting device 50, the configuration is not limited thereto and the pressure in the space 11 may be returned on a regular basis or may be returned every time when a predetermined operation is performed, for example, every time when the machine tool 1 is turned on, every time when the door cover 4 is opened and closed, etc.

Fifth Mode of Judgment Method

As a fifth mode, a mode may be adopted in which the judging section 42 outputs an actuating signal to the pump control section 51 occasionally or on a regular basis and thereby actuates the pump 52 for a predetermined time period to increase or reduce the pressure in the space 11, and inputs pressure data from the pressure sensor 22, and when the detected pressure in the space 11 does not reach a predetermined reference pressure within the predetermined time period, the judging section 42 judges that the airtight state is inappropriate, and outputs an inappropriateness signal to the outside.

Figure 11:
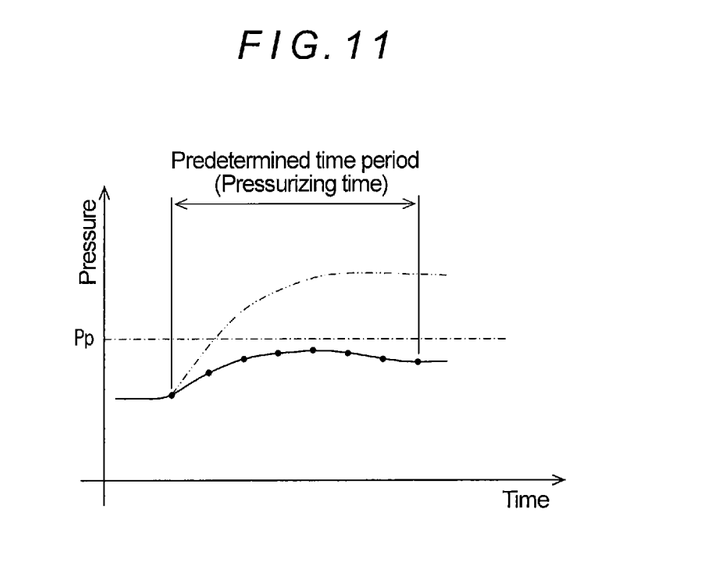
FIG. 11 is an illustration for explaining a fifth mode for judgment of airtight state.

For example, as shown in FIG. 11, the judging section 42 samples pressure data output from the pressure sensor 22 and checks whether the sampled pressure value exceeds a reference pressure (Pp) while the space 11 is pressurized for a predetermined time period, and, when the pressure value does not exceed the reference pressure (Pp) within the predetermined time period, the judging section 42 judges that the airtight state is inappropriate, and outputs an inappropriateness signal to the outside. In FIG. 11, the two-dot chain line indicates a pressure build-up curve in the case where there is no defective leakage.

It is noted that, in this case, the degree of openness of the throttle valve 54 is set depending on leakage amount of the window 5 to be detected, and, the degree of openness of the throttle valve 54 is set to be a degree of openness with which, when there is a leakage amount over the leakage amount to be detected, the pressure in the space 11 does not reach the reference pressure even if the pressure is increased or reduced.

Further, although FIG. 11 shows the case where the space 11 has been brought into a pressurized state, and, similarly to the above, a pressurized state is preferred, the space 11 may be brought into a pressure-reduced state and in this case a state shown by turning FIG. 11 upside down can be assumed.

Furthermore, in this mode, a configuration is possible in which this is started in the state where the pressure in the window 5 has not been increased or reduced as the initial state and is performed occasionally or on a regular basis after the initial state.

As described in detail above, according to each of the airtight state detecting apparatuses 21, 31, 41 of the embodiments, it is possible to accurately detect the airtight state of the window 5.

Further, it is possible to take a proper preventive measure, for example, replacing the window 5 with a new one earlier, when receiving a thus detected inappropriateness signal, and taking such a preventive measure makes it possible to prevent a serious accident in which a tool or a workpiece penetrates the window and shoots out from being caused.

Thus, some embodiments of the present disclosure have been described, but the mode of embodying the present disclosure is not limited thereto.

For example, although the window 5 provided on the door cover 4 of the machine tool 1 was exampled in the above embodiments, the present disclosure is not limited thereto and can be applied to a window 5 provided on the fixed covers 2, 3.

Further, although a window having a glass plate disposed on the machining-region side and a polycarbonate plate disposed on the external side was exampled as the window 5, the structure of the window is not limited thereto and the present disclosure can be preferably applied to a window 5 having a structure in which a material having high wear resistance is used as the window plate disposed on the machining-region side and a material having high toughness and high impact resistance but having low resistance to coolant is used as the window plate disposed on the external side. Furthermore, the present disclosure can be applied regardless to the materials of the two window plates constituting the window 5 as long as the purpose thereof is to detect the airtight state of the space between the two window plates.

What is claimed is:

1. A method of detecting, on a machine tool having a cover body with a window, an airtight state of the window, the window comprising two transparent or translucent window plates which are airtightly joined together with a predetermined distance between them, the method comprising:
    placing a space between the window plates into a pressurized state or a pressure-reduced state and determining a detected pressure value in the space by means of a pressure sensor; and
    judging an appropriateness of the airtight state of the space of the window based on the detected pressure value.

2. The method of claim 1, in which:
    determining the detected pressure in the space is performed occasionally or on a regular basis; and
    when the detected pressure is outside of a predetermined allowable range, the airtight state of the space of the window is judged to be inappropriate.

3. The method of claim 2, in which the allowable range is changed in accordance with an elapsed time from an initial state where the space has been brought into the pressurized state or the pressure-reduced state.

4. The method of claim 2, in which, when it is detected for a predetermined time period or a predetermined number of times that the pressure in the space is within a pressure correction range which is set as a predetermined range within an upper limit or a lower limit of the allowable range, the pressure in the space is increased or reduced to set the pressure in the space to a predetermined pressure which is within the allowable range and out of the pressure correction range.

5. The method of claim 1, in which, when the pressure in the space does not reach a predetermined reference pressure within a predetermined time period at the time of increasing or reducing the pressure in the space, the airtight state is judged to be inappropriate.

6. The method of claim 1, in which the pressure in the space is detected occasionally or on a regular basis, and when variation of the detected pressure exceeds a predetermined variation range, the airtight state is judged to be inappropriate.

7. An airtight state detecting apparatus which detects, on a machine tool having a cover body with a window, an airtight state of the window, the window comprising two transparent or translucent window plates which are airtightly joined together with a predetermined distance between them, the airtight state detecting apparatus comprising:
    a pressure sensor configured to determine a detected pressure value in a space between the window plates; and
    a judging section for judging appropriateness of the airtight state of the space based on the detected pressure value and outputting a result of the judgment.

8. A method of detecting, on a machine tool having a cover body with a window, an airtight state of the window, the window comprising two transparent or translucent window plates which are airtightly joined together with a predetermined distance between them, the method comprising:
    placing a space between the window plates into a pressurized state or a pressure-reduced state and determining a detected pressure in the space; and
    judging an appropriateness of the airtight state of the space of the window based on the detected pressure, in which:
    determining the detected pressure in the space is performed occasionally or on a regular basis;
    when the detected pressure is outside of a predetermined allowable range, the airtight state of the space of the window is judged to be inappropriate; and
    when it is detected for a predetermined time period or a predetermined number of times that the pressure in the space is within a pressure correction range which is set as a predetermined range within an upper limit or a lower limit of the allowable range, the pressure in the space is increased or reduced to set the pressure in the space to a predetermined pressure which is within the allowable range and out of the pressure correction range.

* * * * *